(12) United States Patent
Jeong

(10) Patent No.: US 11,837,980 B2
(45) Date of Patent: Dec. 5, 2023

(54) METHOD AND SYSTEM FOR CREATING DATA MAP FOR FIELD WEAKENING CONTROL OF MOTOR

(71) Applicant: HYUNDAI MOBIS CO., LTD., Seoul (KR)

(72) Inventor: Hyeon Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/718,600

(22) Filed: Apr. 12, 2022

(65) Prior Publication Data
US 2023/0188069 A1     Jun. 15, 2023

(30) Foreign Application Priority Data

Dec. 13, 2021     (KR) ........................ 10-2021-0177627

(51) Int. Cl.
*H02P 21/09*     (2016.01)
*H02P 21/14*     (2016.01)
*H02P 21/18*     (2016.01)

(52) U.S. Cl.
CPC ............ *H02P 21/09* (2016.02); *H02P 21/141* (2013.01); *H02P 21/18* (2016.02)

(58) Field of Classification Search
CPC ........ H02P 21/09; H02P 21/141; H02P 21/18; H02P 21/0089; H02P 23/009
See application file for complete search history.

(56) References Cited

U.S. PATENT DOCUMENTS

| | | | | |
|---|---|---|---|---|
| 11,239,772 B1 * | 2/2022 | Bojoi | ..................... | H02K 11/33 |
| 2011/0241583 A1 * | 10/2011 | He | .......................... | H02P 27/08 |
| | | | | 318/400.09 |
| 2013/0088179 A1 * | 4/2013 | Kobayashi | ............ | H02P 21/141 |
| | | | | 318/400.02 |

(Continued)

FOREIGN PATENT DOCUMENTS

| | | | |
|---|---|---|---|
| CN | 1767355 A | * | 5/2006 |
| JP | H1127996 | * | 1/1999 |

(Continued)

OTHER PUBLICATIONS

Korean Office Action dated May 12, 2023, in counterpart Korean Patent Application No. 10-2021-0177627 (5 pages in Korean).

*Primary Examiner* — Bickey Dhakal
(74) *Attorney, Agent, or Firm* — NSIP Law

(57) ABSTRACT

A motor flux weakening control method with data map creation is provided. The method estimates a phase angle between a dq electric current vector and a d-axis based on a speed of the motor; estimates an input direct current; repeats the estimating of the phase angle and the direct current while decreasing a magnitude of the dq electric current vector based on a difference between the estimated direct current and a preset direct current limitation value; and interrupts the repeating of the estimating of the phase angle and the estimating of the direct current when the direct current and the preset direct current limitation value are equal, and stores a relationship between the speed of the motor, the direct current voltage, the phase angle, and the magnitude of the dq electric current vector, when the estimated direct current and the preset direct current limitation value are equal.

14 Claims, 7 Drawing Sheets

(56) References Cited

U.S. PATENT DOCUMENTS

| | | | |
|---|---|---|---|
| 2013/0154524 A1* | 6/2013 | Kleinau | H02P 21/0089 318/376 |
| 2015/0123592 A1* | 5/2015 | Oga | H02P 21/0089 318/722 |
| 2018/0191283 A1* | 7/2018 | Aoyagi | H02P 21/0089 |

FOREIGN PATENT DOCUMENTS

| | | |
|---|---|---|
| JP | 2003-219678 A | 7/2003 |
| JP | 2010-57228 A | 3/2010 |
| JP | 2015-6067 A | 1/2015 |
| KR | 10-2013-0005190 A | 1/2013 |
| KR | 10-1271732 B1 | 6/2013 |

\* cited by examiner

METHOD AND SYSTEM FOR CREATING DATA MAP FOR FIELD WEAKENING CONTROL OF MOTOR

CROSS REFERENCE TO RELATED APPLICATION

This application claims the benefit under 35 USC § 119(a) of Korean Patent Application No. 10-2021-0177627, filed on Dec. 13, 2021, in the Korean Intellectual Property Office, the entire disclosure of which is incorporated herein by reference for all purposes.

BACKGROUND

1. Field

The following description relates to a method and a system for creating a data map for field weakening control of a motor.

2. Description of Related Art

In a situation where it is beneficial that a motor is driven at a high speed, torque of the motor has to be increased to increase a speed of the motor. However, there is a limitation on a magnitude of a voltage that is supplied to the motor. In order to overcome this limitation, a field weakening control method that decreases magnetic flux of the motor and thus increases the speed of the motor is employed.

Typically, for flux weakening control, a method is employed in which an electric current command in use for flux weakening control is generated using a data map in which electric current for a stator and a phase angle for the flux weakening control according to the speed of the motor and an input voltage for the motor are stored in advance. Typically, to employ this flux weakening control method, an operator has to create the data map by performing manual tuning operations one by one through experimentations. Accordingly, consistent motor control is difficult to perform, and it takes much time to perform the manual tuning operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a motor flux weakening control method with data map creation, the method includes estimating a phase angle between a dq electric current vector for a motor and a d-axis based on a speed of the motor; calculating a torque of the motor based on the estimated phase angle; estimating a direct current that is input into the motor, based on an output of the motor; repeating the estimating of the phase angle and the estimating of the direct current while decreasing a magnitude of the dq electric current vector based on a difference between the estimated direct current and a preset direct current limitation value; interrupting the repeating of the estimating of the phase angle and the estimating of the direct current when the direct current estimated in the repeating of the estimating of the phase angle and the estimating of the direct current and the preset direct current limitation value are equal; and storing a relationship between the speed of the motor, the direct current voltage that is input into the motor, the phase angle, and the magnitude of the dq electric current vector when the estimated direct current and the preset direct current limitation value are equal.

The torque of the motor may be determined based on the estimated phase angle.

The output of the motor may be determined based on the determined torque, a resistance loss in the motor, and the direct current voltage input into the motor.

The estimating of the phase angle, the phase angle is estimated based on the following equation:

$$\gamma(\omega_r) = \tan^{-1}\left(\frac{R_s^2}{(\omega_r L_s)^2}\right) + \sin^{-1}\left(\frac{v_L^2 - I_s^2\{R_s^2 + (\omega_r L_s)^2\} + \omega_r \phi}{2I_s \omega_r \phi}\bigg/\sqrt{R_s^2 + (\omega_r L_2)^2}\right)$$

where $\gamma$ is the estimated phase angle, $R_s$ is the resistance in the motor, $L_s$ is an inductance in the motor, $\omega_r$ is a rotational speed of the motor, $$v_L = \frac{V_{dc}}{\sqrt{3}}, V_{dc} = V_{batt} - R_c i_b, V_{batt}$$

is a battery voltage at which direct current power provided to the motor is stored, $R_c$ is a resistance of a conductive line from a battery to the motor, $i_b$ is the direct current having a preset initial value, $I_s$ is the magnitude of the dq electric current vector, and $\Phi$ is a field magnet flux of the motor.

The estimating of the direct current, the direct current may be estimated based on the following equation:

$$i_b = \frac{P_{output} + P_{ml}}{V_{dc}} = \frac{\tau \omega_r + \frac{3}{2}\left(\sqrt{i_d^2 + i_q^2}\right)^2 \times R_s}{V_{dc}},$$

where $i_b$ is the estimated direct current, $i_d = I_s \sin(\gamma)$, $i_q = I_s \cos(\gamma)$, $\gamma$ is the phase angle estimated in the estimating of the phase angle, $\tau = k_t \times i_q$, $K_t$ is a predetermined torque constant of the motor that is determined based on a characteristic of the motor, $\omega_r$ is a rotational speed of the motor, $R_s$ is a resistance in the motor, and $V_{dc}$ is the direct current voltage that is input into the motor.

In the repeating of the estimating of the phase angle and the estimating of the direct current, for a motor speed section where a magnitude of the direct current estimated in the estimating of the direct current is larger than a direct current limitation value, an error value resulting from subtracting the direct current limitation value from the magnitude of the estimated direct current is obtained, the magnitude of the dq electric current vector is decreased based on the error value, the estimating of the phase angle and the estimating of the direct current are repeated by applying the decreased magnitude of the dq electric current vector.

In the repeating of the estimating of the phase angle and the estimating of the direct current, a value obtained from multiplying the error value by a preset constant is subtracted from the magnitude of the dq electric current vector, the magnitude of the dq electric current vector is decreased, and the estimating of the phase angle and the estimating of the direct current are repeated by applying the decreased magnitude of the dq electric current vector.

The method may include repeating the estimating of the phase angle and the estimating of the direct current until a radix of an electric power function for an Electronic Control Unit (ECU) is obtained by implementing a Newton-Raphson Method to obtain the radix based on an entire electric power of a motor drive system, wherein the repeating of the estimating of the phase angle and the estimating of the direct current is performed subsequent to the estimating of the direct current. The electric power function for the ECU is determined based on the following equation:

$$P(i_b) = -V_{dc}i_b + i_b^2 R_c + \frac{3}{2}\left(\sqrt{i_d^2 + i_q^2}\right)^2 R_s + \tau\omega_r,$$

where $P(i_b)$ is the electric power function for the ECU, $V_{dc}$ is the direct current voltage that is input into the motor, $i_b$ is the estimated direct current, $i_d=I_s \sin(\gamma)$, $i_q=I_s \cos(\gamma)$, $\gamma$ is the phase angle estimated in the estimating of the phase angle, $R_s$ is a resistance in the motor, $\tau=k_t \times i_q$, $k_t$ is a predetermined torque constant of the motor that is determined based on a characteristic of the motor, $\omega_r$ is a rotational speed of the motor, and $R_c$ is a resistance of a conductive line from a battery in which direct current power provided to the motor is stored.

The method may include repeating the estimating of the phase angle and the estimating of the direct current until a radix of an electric power function for an Electronic Control Unit (ECU) is obtained by implementing a Newton-Raphson Method to obtain the radix based on an entire electric power of a motor drive system, wherein the repeating of the estimating of the phase angle and the estimating of the direct current is performed subsequent to the estimating of the direct current.

The electric power function for the ECU may be determined based on the following equation:

$$P(i_b) = -V_{dc}i_b + i_b^2 R_c + \frac{3}{2}\left(\sqrt{i_d^2 + i_q^2}\right)^2 R_s + \tau\omega_r,$$

where $P(i_b)$ is the electric power function for the ECU, $V_{dc}$ is the direct current voltage that is input into the motor, $i_b$ is the estimated direct current, $i_d=I_s \sin(\gamma)$, $i_q=I_s \cos(\gamma)$, $\gamma$ is the phase angle estimated in the estimating of the phase angle, $R_s$ is a resistance in the motor, $\tau=k_t \times i_q$, $k_t$ is a predetermined torque constant of the motor that is determined based on a characteristic of the motor, $\omega_r$ is a rotational speed of the motor, and $R_c$ is a resistance of a conductive line from a battery in which direct current power provided to the motor is stored.

In the repeating of the estimating of the phase angle and the estimating of the direct current until the radix of an electric power function for the ECU is obtained, to obtain the radix that satisfies $P(i_b)=0$, the estimating of the phase angle and the estimating of the direct current are repeated until $$\frac{P(i_{bi})}{P'(i_{bi})}$$

becomes less than a preset reference value in the following equation:

$$\frac{P(i_{bi})}{P'(i_{bi})}$$

where $P'(i_b)$ is a differential of $P(i_b)$.

In a general aspect, a motor flux weakening control data map creation system includes one or more processors, configured to: estimate a phase angle between a dq electric current vector for a motor and a d-axis based on a speed of the motor; calculate a torque of the motor based on the estimated phase angle; estimate a direct current that is input to the motor based on an output of the motor; repeat the estimating of the phase angle and the estimating of the direct current while decreasing a magnitude of the dq electric current vector based on a difference between the estimated direct current and a preset direct current limitation value; interrupt the repeating of the estimating of the phase angle and the estimating of the direct current when the direct current estimated in the repeating of the estimating of the phase angle and the estimating of the direct current and the preset direct current limitation value are equal; and store a relationship between the speed of the motor, the direct current voltage that is input into the motor, the phase angle, and the magnitude of the dq electric current vector when the estimated direct current and the preset direct current limitation value are equal.

The torque of the motor may be determined based on the estimated phase angle.

The output of the motor may be determined based on the determined torque, a resistance loss in the motor, and the direct current voltage input into the motor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
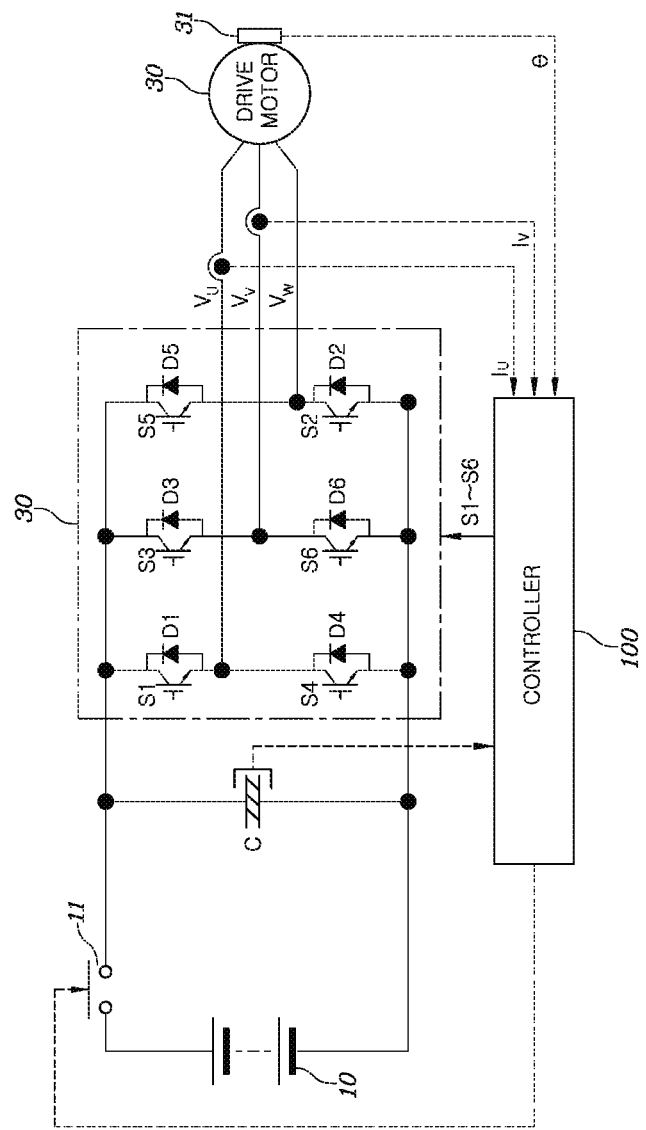
FIG. 1 is a circuit diagram illustrating an example of a motor drive system that is driven through application of a data map created with a method for creating a data map for flux weakening control of a motor, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

The one or more examples may enable the field weakening control of a motor in a state where electric current for the motor is limited to a desired magnitude.

With the example method for creating a data map for flux weakening control of a motor, the direct current for the motor can be limited according to a user's need.

Particularly, with the example method for creating a data map for flux weakening control of a motor, the map may be created by implementing a computer system to which an appropriate algorithm is applied, instead of performing manual tuning. Thus, the performance of the motor can be optimized.

FIG. 1 is a circuit diagram illustrating an example of a motor drive system that is driven through application of a data map created with a method for creating a data map for flux weakening control of a motor, in accordance with one or more embodiments.

With reference to FIG. 1, the motor drive system that is driven through application of the data map created with the method for creating a data map for flux weakening control of a motor according to the example embodiment may be configured to include an energy storage device 10, an inverter 20, a motor 30, a rotational-angle sensor 31, and a controller 100.

The energy storage device 10 serves as a constituent element, such as a battery, in which electric energy for driving the motor 30 is stored in such a manner as to supply direct current. The energy storage device 10 may supply direct current power to an input terminal of an inverter 13.

The inverter 13 serves as a constituent element for converting direct current power, which is stored as electric energy in the energy storage device 10 and is supplied therefrom, into alternating current power for motor driving. The inverter 13 may include a plurality of switching elements S1 to S6 of which ON and OFF states are controlled with a pulse-width modulation signal provided by the controller 100.

The motor 30 serves as a constituent element that is supplied with three-phase alternating current power from the inverter 20 and generates a rotational force. Various types of motors that are known in the art to which the one or more examples pertain may be used as the motor 30. For example, the motor 30 may find application as a steering drive motor for use in a motor driven power steering (MDPS) system within a vehicle, a motor that provides a rotational force to a drive wheel of an environment-friendly vehicle, or other motor.

The rotational-angle sensor 31 serves as a constituent element that measures a position of a motor rotor, that is, a rotational angle of the motor rotor. The rotational-angle sensor 31 may measure a rotational angle of a rotor of the motor 30 and may successively output rotational-angle measurement signals, each including information on the measured rotational angle of the rotor. For example, the rotational-angle sensor 31 may be realized as a resolver or the like.

The controller 100 may perform control according to a pulse-width modulation scheme in order to fundamentally perform control that sets torque of the motor 30 to a desired value. The control according to the pulse-width modulation scheme suitably adjusts duty cycles (duty ratios) of the switching elements S1 to S6 of the inverter 20. For this control, at a specific point in time, the controller 100 performs a sampling of values Iu and Iv that result from detecting signals provided from the rotational-angle sensor 31 and detecting electric current supplied to the motor 30. Then, on the basis of the sampled values, the controller 100 derives information associated with the torque of the motor 30 that is currently being driven.

In addition, the controller 100 compares the information associated with the torque of the motor 30 currently being driven, the information being derived from the sampled values, with a torque command value (a torque target value that is desired to be obtained through the motor 30) for the motor 30, the torque command value being input from the outside. Then, on the basis of the result of the comparison, the controller 100 controls the switching elements S1 to S6 of the inverter in such a manner that the motor 30 outputs a value corresponding to the torque command value.

Particularly, the controller 100 may perform flux weakening control of the motor in a section where the motor is driven at a high speed, using the data map created with the method for creating a data map for flux weakening control of a motor, in accordance with one or more embodiments.

Figure 2:
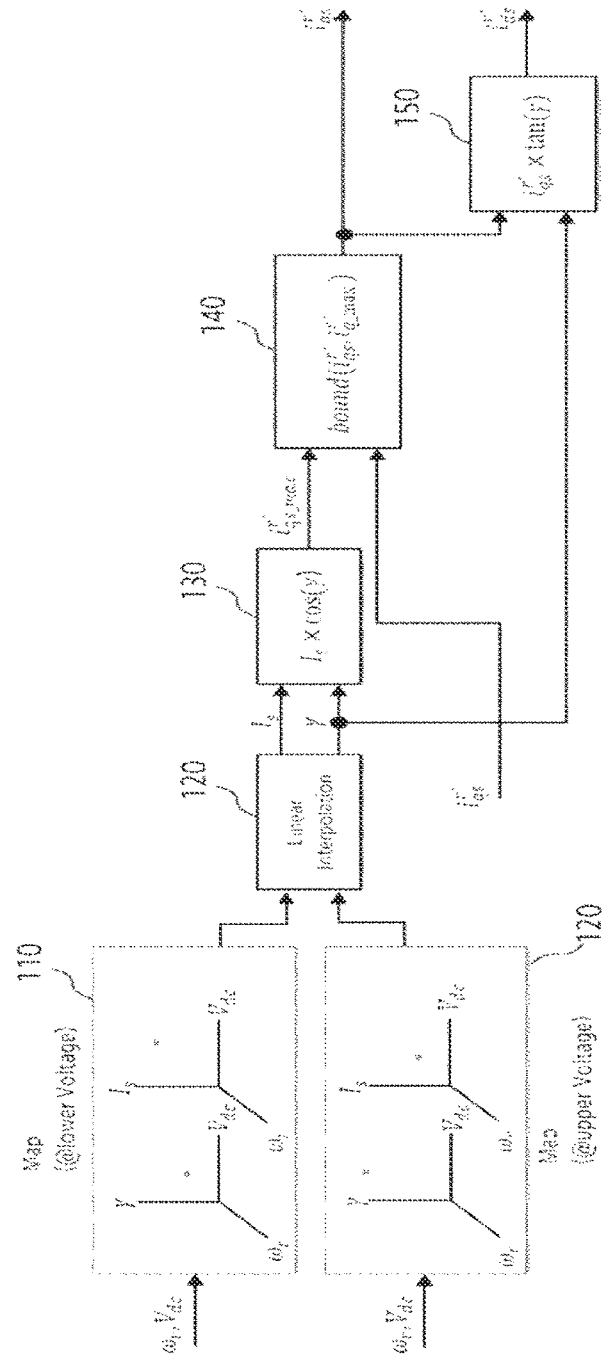
FIG. 2 is a block diagram illustrating a configuration of a flux weakening controller that uses the data map created with the method for creating a data map for flux weakening control of a motor, in accordance with one or more embodiments.

FIG. 2 is a block diagram illustrating a configuration of a flux weakening controller that uses the data map created with the method for creating a data map for flux weakening control of a motor, in accordance with one or more embodiments.

The flux weakening controller illustrated in FIG. 2 may be provided within the controller 100 in FIG. 1. The flux weakening controller includes data maps 110 and 120. The data map 110 receives motor speed $\omega_r$ as an input and outputs phase angle r that corresponds to the received value. The data map 120 receives direct current voltage (which corresponds to an inverter input voltage in FIG. 1) $V_{dc}$ as an input, which is supplied to the motor, and outputs magnitude $I_s$ of a dq electric current vector that corresponds to the received value.

Stored in the data map 110 is phase angle γ that varies with motor speed $\omega_r$. Stored in the data map 120 is magnitude $I_s$ of the dq electric current vector that varies with direct current voltage $V_{dc}$. When the motor is actually driven, in a case where the flux weakening control is performed, the data map 110 may receive measured motor speed $\omega_r$ as an input, and may search for and output phase angle γ that corresponds thereto. The data map 120 may receive measured direct current voltage $V_{dc}$ as an input, and may search for and output magnitude $I_s$ of the dq electric current vector that corresponds thereto.

Stored in the data maps 110 and 120 are pieces of discrete data. Therefore, the data maps 110 and 120 each do not output a value that precisely corresponds to the voltage that is input. Therefore, the data map 110 may output two phase angles γ that correspond to indexes, respectively, of upper and lower values closest to the voltage that is input. The data map 120 may output two magnitudes $I_s$ of dq electric current vectors that correspond to the indexes, respectively, of the upper and lower values closest to the voltage that is input. Linear interpolation is performed on the two phase angles r and two magnitudes $I_s$ of the dq electric current vectors (120). Thus, phase γ and magnitude $I_s$ of the dq electric current vector that correspond to motor speed $\omega_r$ and direct current voltage $V_{dc}$, respectively, are determined. Then, maximum value $i_{qs\_max}{}^{r*}$ of a q-axis electric current command may be determined through computation that uses a dq electric current command and the phase angle (130).

In addition, the flux weakening controller limits q-axis electric current command $i_{qs}{}^{r*}$ determined on the basis of a torque command to the motor to computed maximum value $i_{qs\_max}{}^{r*}$ of the q-axis electric current command and outputs a final q-axis electric current command (140). Then, the flux weakening controller applies the phase angle to the finally determined q-axis electric current command and thus may generate d-axis electric current command $i_{ds}{}^{r*}$.

The method for creating a data map for flux weakening control of a motor, in accordance with one or more embodiments may serve the purpose of creating the data maps 110 and 120 that are used for the flux weakening control.

Figure 3:
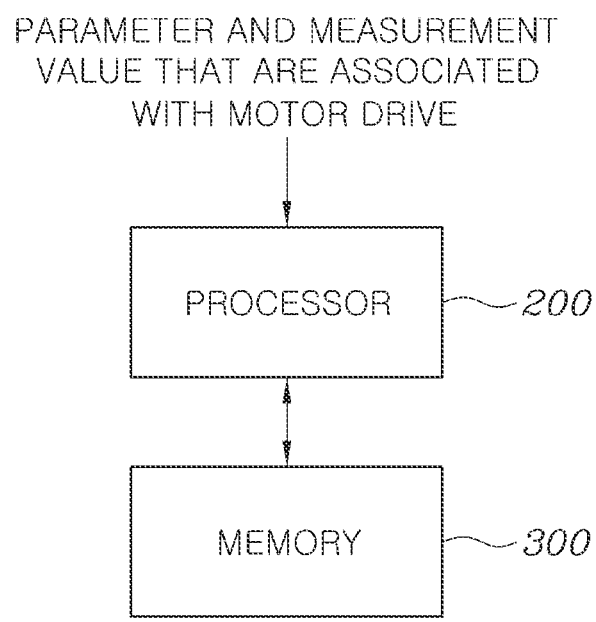
FIG. 3 is a block diagram illustrating a configuration of a system for implementing the method for creating a data map for flux weakening control of a motor, in accordance with one or more embodiments.

FIG. 3 is a block diagram illustrating a configuration of a system for implementing the method for creating a data map for flux weakening control of a motor, in accordance with one or more embodiments.

With reference to FIG. 3, the system for implementing the method for creating a data map for flux weakening control of a motor may be configured to include a processor 200 and a memory 300. The processor 200 performs various computation and determination operations that are necessary to create the data map. Various pieces of data required for the processor 200 to perform the computation and determination operations are stored in the memory 300.

In order to perform the computation and determination operations necessary to create the data map, the processor 200 may be provided with various parameters determined in advance for the motor subject to the flux weakening control and, according to need, may store these parameters in the memory 300 or may read the stored parameters therefrom.

In addition, the processor 200 may store in the memory 300 pieces of data that result from the computation and determination operations, the pieces of data being required to create the data map, and may finally store the created data map in the memory 300.

Figure 4:
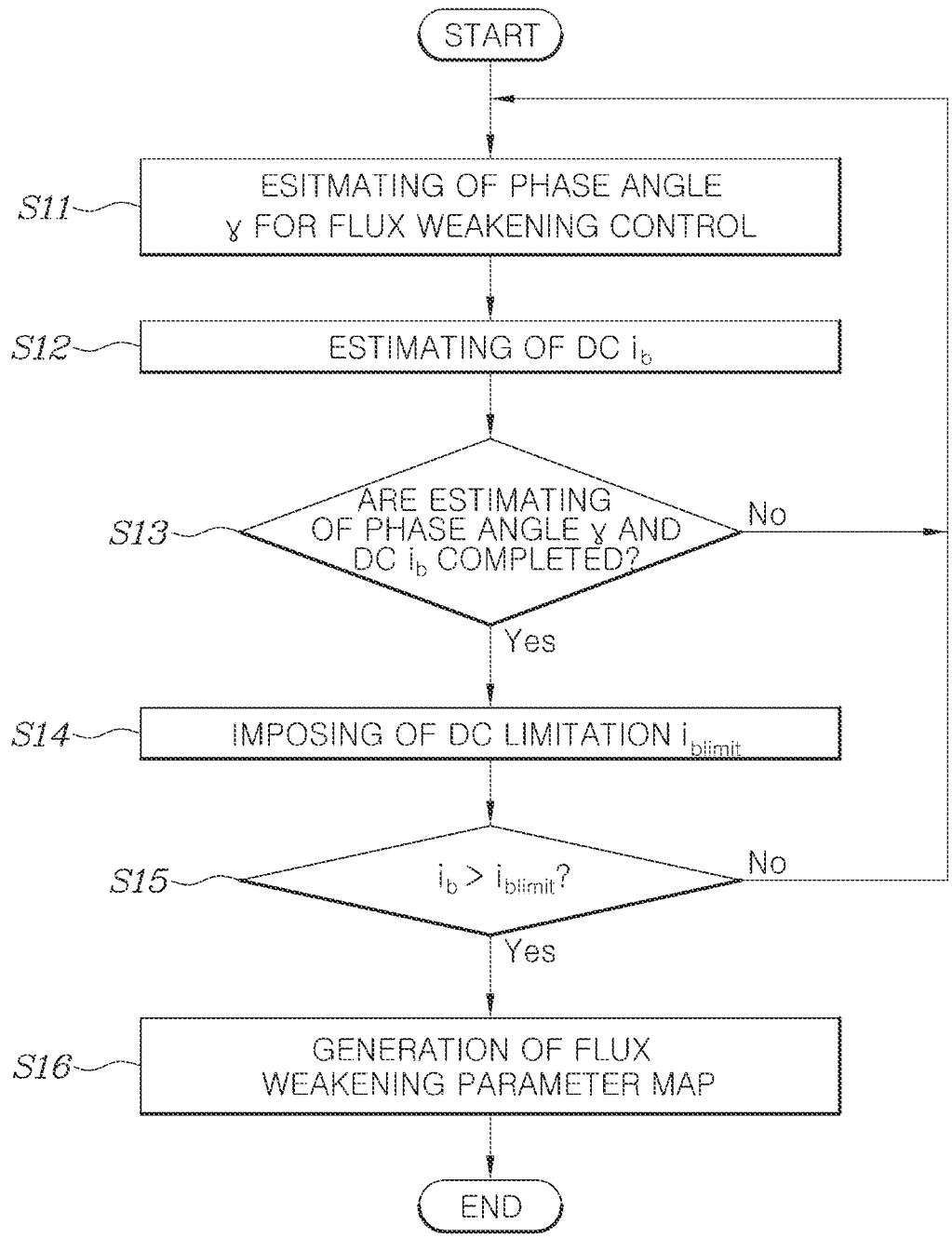
FIG. 4 is a flowchart illustrating the method for creating a data map for flux weakening control of a motor, in accordance with one or more embodiments.

FIG. 4 is a flowchart illustrating the method for creating a data map for flux weakening control of a motor, in accordance with one or more embodiments.

With reference to FIG. 4, in the method for creating a data map for flux weakening control of a motor, in accordance with one or more embodiments, first, a step S11 of estimating the phase angle to be applied for the flux weakening control may be a step in which a processor 10 derives the phase angle to be applied for the flux weakening control using various parameters for a motor that are input.

Figure 5:
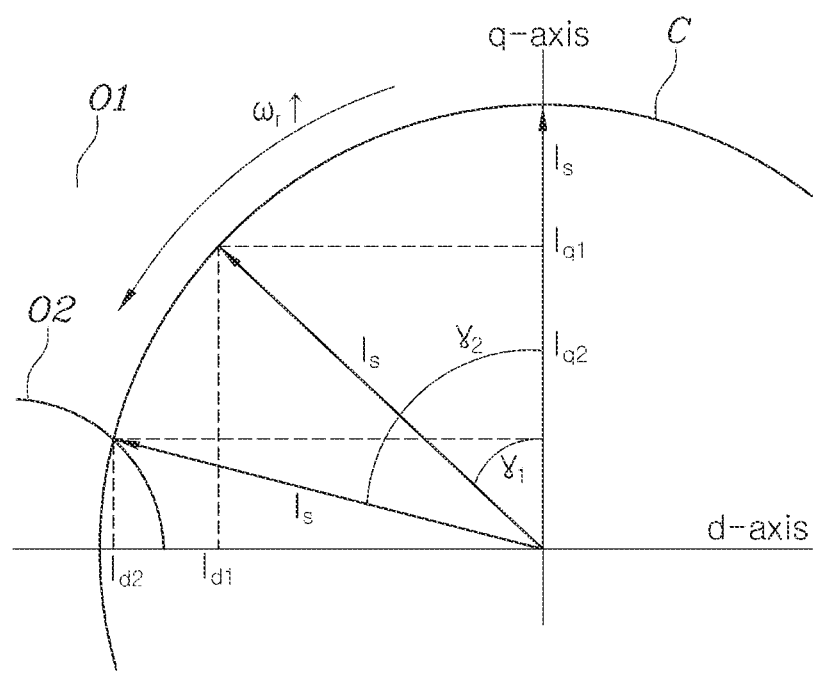
FIG. 5 is a view illustrating a circle representing an electric current limitation for the motor and a circle representing a voltage limitation according to a rotational speed of the motor, the two circles being expressed on a coordinate plane where a d-axis represents d-axis electric current and where a q-axis represents q-axis electric current, in accordance with one or more embodiments.

FIG. 5 is a view illustrating a circle representing an electric current limitation for the motor and a circle representing a voltage limitation according to a rotational speed of the motor, the two circles being expressed on a coordinate plane where a d-axis represents d-axis electric current and where a q-axis represents q-axis electric current.

As illustrated in FIG. 5, electric current of a stator of the motor, that is, vector electric current $I_s$ has a limitation as expressed by a circle C on the coordinate plane where the d-axis and the q-axis represent vector electric current. A voltage of the motor has a limitation as expressed by circles O1 and O2. Particularly, for the voltage of the motor, the higher the rotational speed of the motor, the smaller size the circle representing the voltage limitation has.

Usually, torque control of the motor is performed with a scheme of estimating electric current of the motor on a curve known as maximum torque per ampere (MTPA). In a case where the rotational speed of the motor is low, because the circle representing the voltage limitation has a sufficiently large size, the MTPA curve is formed inside the circle representing the voltage limitation. Therefore, the torque control is possible. However, an increase in the rotational speed of the motor decreases the size of the circle representing the voltage limitation. Thus, when the MPTA curve is positioned outside the circle representing the voltage limitation, it is impossible to control the motor in such a manner as to output a desired speed at desired torque. The flux weakening control is started.

In a case where the flux weakening control is performed, an electric current command may be estimated at a point where the circle C representing the electric current limitation and the circles O1 and O2 each representing the voltage limitation meet. It can be checked that effective magnetic flux is further decreased because the higher the rotational speed of the motor, the more the d-axis electric current is increased in a negative direction.

Phase angle $\gamma$ refers to an angle that a straight line in a dq coordinate plane where the vector electric current is plotted makes with respect to the q-axis. The straight line connects the origin point and a point where the circle representing the electric current limitation and the circle representing the voltage limitation meet.

In Step S11, phase angle $\gamma$ can be theoretically estimated as follows.

A voltage equation for the motor can be expressed as following Equations 1 and 2.

$$v_d = R_s i_d + L_s \frac{di_d}{dt} - \omega_r L_s i_q \quad \text{Equation 1}$$

$$v_q = R_s i_q + L_s \frac{di_q}{dt} + \omega_r L_s i_d + \omega_r \phi \quad \text{Equation 2}$$

where $v_d$ is a d-axis voltage of the motor, $v_q$ is a q-axis voltage of the motor, $R_s$ is a resistance in the motor, $L_s$ is an inductance in the motor, $\omega_r$ is a rotational speed of the motor, $i_d$ is a d-axis voltage of the motor, $i_q$ is q-axis current of the motor, and $\phi$ is a field magnet flux of the motor.

In Equations 1 and 2, in a case where the motor is in a normal state (in a state where a constant output is produced), the terms $$\frac{di_d}{dt} \text{ and } \frac{di_q}{dt}$$

are 0 (zero) because there is no change in electric current. Therefore, Equations 1 and 2 can be rewritten as following Equations 3 and 4, respectively.

$$v_d = R_s i_d - \omega_r L_s i_q \quad \text{Equation 3}$$

$$v_q = R_s i_q + \omega_r L_s i_d + \omega_r \phi \quad \text{Equation 4}$$

A relationship between a dq voltage of the motor and input voltage $V_L$ is expressed as in following Equation 5. Therefore, Equation 6 can be derived when Equations 3 and 4 are substituted into Equation 5.

$$v_d^2 + v_q^2 = v_L^2 \quad \text{Equation 5}$$

where $$v_L = \frac{V_{dc}}{\sqrt{3}}$$

and $V_{dc}$ is a direct current voltage that is supplied to the motor. Usually, $V_{dc}$ can be determined as a value that results from subtracting the product of direct current $i_b$ supplied to the motor and resistance $R_c$ of a conductive line from the battery to the motor from battery voltage $V_{batt}$ at which the direct current to be supplied to the motor is stored ($V_{dc} = V_{batt} - R_c i_b$ where an initial value of $i_b$ can be set in advance).

Following Equation 6 can be obtained when Equations 3 and 4 are substituted into Equation 5.

$$(R_s i_d - \omega_r L_s i_q)^2 + (R_s i_q + \omega_r L_s i_d + \omega_r \phi)^2 = v_L^2 \quad \text{Equation 6}$$

The d-axis electric current and the q-axis electric current correspond to d-axis and q-axis components, respectively, of electric current $I_s$ of the stator of the motor, and thus can be expressed as $i_d = -I_s \sin(\gamma)$ and $i_q = I_s \cos(\gamma)$, respectively. When $i_d = -I_s \sin(\gamma)$ and $i_q = \cos(\gamma)$ are substituted into Equation 6, following Equation 7 can be obtained. When Equation 7 is rewritten in terms of the phase angle, Equation 8 can be finally obtained. In Equation 7, $I_s$ is a magnitude of the dq electric current vector, and a maximum value of $I_s$ is determined during the design of the motor.

$$(-R_s i_s \sin(\gamma) - \omega_r L_s i_s \cos(\gamma))^2 + \quad \text{Equation 7}$$
$$(R_s i_s \cos(\gamma) - \omega_r L_s i_s \sin(\gamma) + \omega_r \phi)^2 = v_L^2$$

$$\gamma(\omega_r) = \tan^{-1}\left(\frac{R_s^2}{(\omega_r L_s)^2}\right) + \quad \text{Equation 8}$$
$$\sin^{-1}\left(\frac{v_L^2 - I_s^2\{R_s^2 + (\omega_r L_s)^2\} + \omega_r \phi}{2 I_s \omega_r \phi} / \sqrt{R_s^2 + (\omega_r L_s)^2}\right)$$

As in Equation 8 where phase angle $\gamma$ is expressed as a function of motor speed $\omega_r$, the phase angle can be estimated according to the motor speed in Step S11 of estimating the phase angle.

Subsequently, when Step S11 of estimating the phase angle is ended, the processor may perform Step S12 of estimating the direct current.

Figure 6:
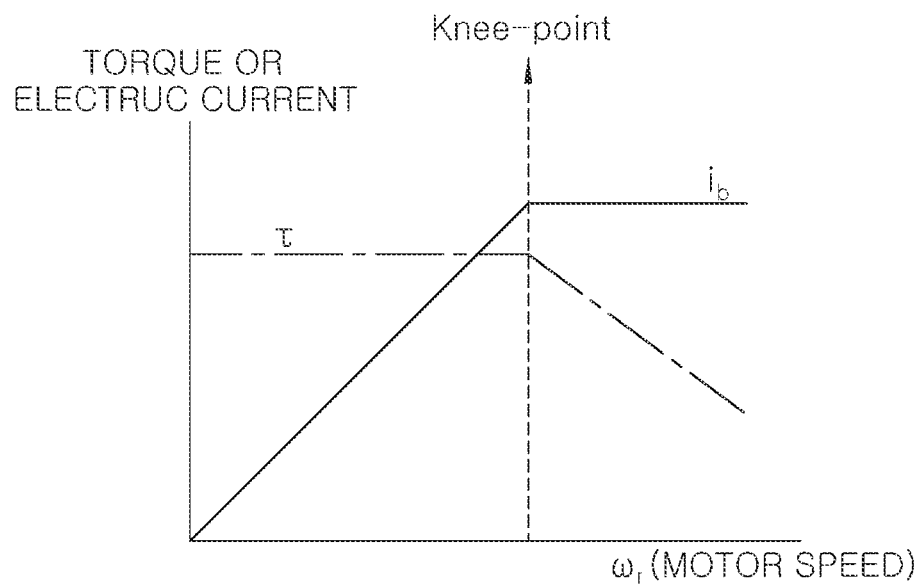
FIG. 6 is a graph illustrating a relationship between a speed and torque of the motor and a relationship between the speed and direct current, in accordance with one or more embodiments.

FIG. 6 is a graph illustrating a relationship between a speed and torque of the motor and a relationship between the speed and direct current.

As illustrated in FIG. 6, in a case where the motor speed is lower than that at a knee-point at which the motor speed is constant, the motor drive during which the electric current of the motor is determined on the curve called Maximum Torque Per Ampere (MTPA) is performed as described above. In a case where the motor speed is equal to or higher than that at the knee-point, it is impossible to control the motor in such a manner as to output a desired speed at a desired torque. Thus, the flux weakening control is performed. In this section, direct current $i_b$ that is input is uniformly maintained.

In a section where the rotational speed of the motor is lower than that at the knee-point, the d-axis electric current of the motor is 0, and the q-axis electric current thereof has a value equal to $I_s$. In a section where the rotational speed of the motor is equal to or higher than that at the knee-point (a flux weakening control section), the d-axis electric current of the motor and q-axis electric current of the motor can be determined as in following Equation 9.

$$i_d = I_s \sin(\gamma)$$

$$i_q = I_s \cos(\gamma) \quad \text{Equation 9:}$$

As phase angle $\gamma$ in Equation 9, the phase angle estimated in Step S11 may be used. Torque $\tau$ of the motor may be computed as in following Equation 10, using the q-axis electric current computed using Equation 9 in a section where the rotational speed of the motor is higher than that at the knee-point.

$$\tau = k_t \times i_q \quad \text{Equation 10:}$$

where $k_t$ is a constant of the torque of the motor and is a value that may be determined in advance on the basis of a characteristic of the motor.

Electric power of the motor can be expressed as the product of a direct current voltage and direct current. Therefore, the direct current is equal to the total electric power of the motor divided by the direct current voltage. At this point, the electric power of the motor is equal to the sum of an output of the motor and a loss in the motor. Therefore, the direct current may be estimated as in following Equation 11.

$$i_b = \frac{P_{output} + P_{ml}}{V_{dc}} = \frac{\tau \omega_r + \frac{3}{2}\left(\sqrt{i_d^2 + i_q^2}\right)^2 \times R_s}{V_{dc}} \quad \text{Equation 11}$$

where $P_{output}$ is the output of the motor and $P_{ml}$ is the loss in the motor. The output of the motor is equal to a value resulting from multiplying the torque by the motor speed. It is known that the loss in the motor can be expressed as $$\frac{3}{2}\left(\sqrt{i_d^2 + i_q^2}\right)^2 \times R_s.$$

Phase angle $\gamma$ and direct current $i_b$ for the flux weakening control that are estimated using Equations 8 and 11 in Steps S11 and S12, respectively, may not be precise. In order to increase precisions of the estimated values, according to the examples, Step S13 may be performed. In Step S13, the precisions of the estimated values are increased to a predetermined level or higher by obtaining radix $i_b$ of electric power function $P(i_b)$ for an Electronic Control Unit (ECU) using the Newton-Raphson Method, and then estimating is ended.

Electric power function $P(i_b)$ for the ECU can be obtained as follows.

$$P_{total} = P_{ECU} + P_{cable} + P_{ml} + P_{output} \quad \text{Equation 12:}$$

Total electric power $P_{total}$ for the motor drive system is expressed in Equation 12 where $P_{ECU}$ is an electric power function for the ECU of the motor drive system, $P_{cable}$ corresponds to a loss in the electric power that occurs in a cable inside the motor drive system, $P_{ml}$ corresponds to a loss in the motor itself, and $P_{output}$ corresponds to an output of the motor. Each of the terms can be expressed as in following Equation 13.

$$V_{dc} i_b = P_{ECU} + i_b^2 R_c + \frac{3}{2}\left(\sqrt{i_d^2 + i_q^2}\right)^2 R_s + \tau \omega_r \quad \text{Equation 13}$$

When Equation 13 is rewritten in terms of electric power function $P(i_b)$ for the ECU, following Equation 14 is obtained.

$$\therefore P(i_b) = -V_{dc} i_b + i_b^2 R_c + \frac{3}{2}\left(\sqrt{i_d^2 + i_q^2}\right)^2 R_s + \tau \omega_r \quad \text{Equation 14}$$

A radix that satisfies $P(i_b)=0$ can be obtained by applying the Newton-Raphson Method to Equation 14 as in following Equation 15.

$$i_{bi+1} = i_{bi} - \frac{P(i_{bi})}{P'(i_{bi})} \quad \text{Equation 15}$$

where $P'(i_b)$ means a differential of $P(i_b)$.

Steps S11 to S13 are repeated until $$\frac{P(i_{bi})}{P'(i_{bi})}$$

corresponding to an error is sufficiently decreased (is decreased to a value lower than a preset reference value) in Equation 15, and thus the precision of estimating of the phase value and the precision estimating of the direct current for the flux weakening control can be increased.

When in Step S13, the term $$\frac{P(i_{bi})}{P'(i_{bi})}$$

in Equation 15 is decreased to the value lower than the preset reference value, the estimating of the phase angle and the estimating of the direct current are ended, and Step S14 of applying a limitation value of the direct current may be performed.

Figure 7:
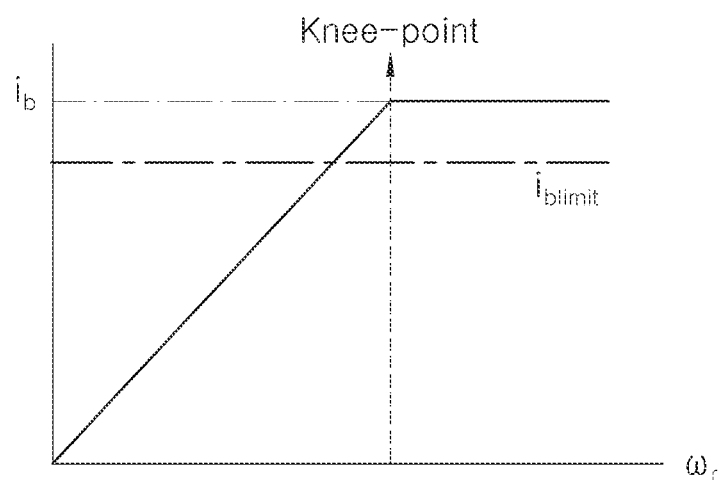
FIG. 7 is a view illustrating an example of a direct current limitation imposed in the method for creating a data map for flux weakening control of a motor, in accordance with one or more embodiments.

FIG. 7 is a view illustrating an example of a direct current limitation imposed in the method for creating a data map for flux weakening control of a motor, in accordance with one or more embodiments.

With reference to FIG. 7, there is a need to optimize the electric power consumed by the vehicle during the flux weakening control of the motor and to limit the direct current according to a design reference at the user's request. That is, as illustrated in FIG. 7, there is a need to limit the direct current for the motor in such a manner as to have direct current $i_{blimit}$ that is a value lower than a magnitude of direct current $i_b$ that can be provided to the motor.

In Step S14, on the basis of a difference between estimated direct current $i_b$ and direct current limitation value $i_{blimit}$, Steps S11 and S13 can be performed while decreasing magnitude $I_s$ of the dq electric current vector.

More specifically, in Step S14, for a motor speed section where the magnitude of the direct current $i_b$ estimated through Steps S11 and S13 is at a value higher than direct current limitation value $i_{blimit}$, a difference $\Delta i_b$ between these two values can be obtained as in following Equation 16.

$$\Delta i_b = i_b - i_{blimit} (@i_b > i_{blimit})$$ Equation 16:

In this section, $\Delta i_b$ is multiplied by constant k that is set to a sufficiently low value for being applied to dq electric current vector $I_s$, and the result of the multiplication is applied to $I_s$ as in following Equation 17.

$$I_s = I_{s\_old} - \Delta i_b \times k (@i_b > i_{blimit})$$

where $I_{s\_old}$ means a magnitude of the dq electric current vector determined in a cycle immediately before computation is repeatedly performed.

Steps S11 to S13 may be performed by applying the magnitude of the dq electric current that is determined using Equation 17 (S15). A value of the electric current for the motor that is estimated by repeating Steps S11 to S13 gradually approaches electric current limitation value $i_{blimit}$ and finally can be substantially the same as the direct current limitation value $i_{blimit}$.

When an estimation value of the direct current falls at or below direct current limitation $i_{blimit}$ by performing Steps S14 and S15, repeating of Steps S11 to S13 for applying the electric current limitation is interrupted (S15). Then, a relationship between motor speed $\omega_r$ at a point in time when the interruption occurs and magnitude $I_s$ of the electric current vector that varies direct current voltage $V_{dc}$ for the motor, and ?a relationship among motor speed $\omega_r$ at a point in time when the interruption occurs, magnitude $I_s$ of the electric current vector that varies direct current voltage Vds for the motor, and phase angle estimation value γ may be created (S16).

Figure 8:
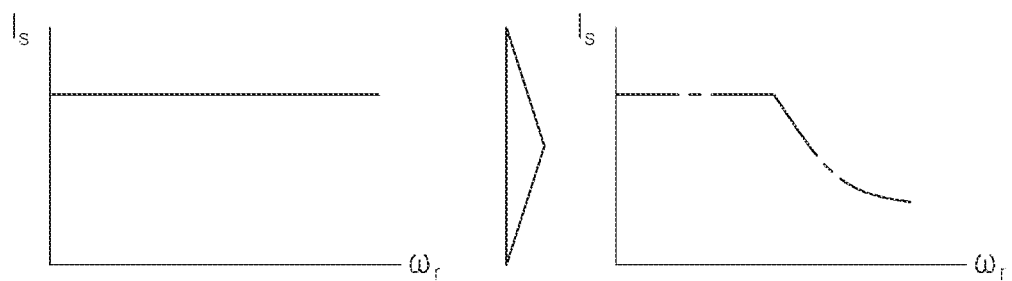
FIGS. 8 and 9 are views illustrating a change in a dq electric current vector and a change in the direct current for the motor, respectively, that are caused by the method for creating a data map for flux weakening control of a motor, in accordance with one or more embodiments.
Figure 9:
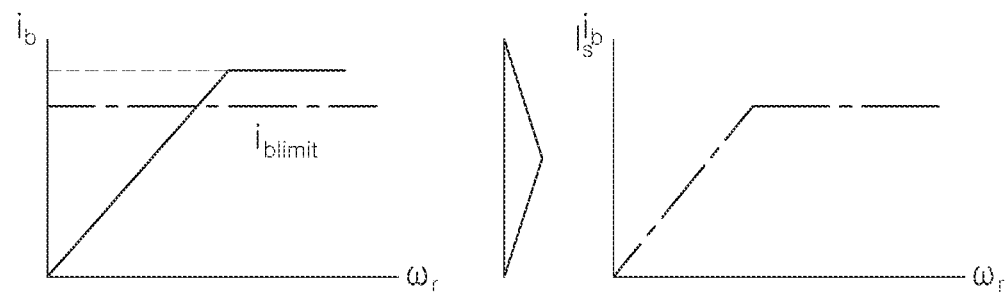

FIGS. 8 and 9 are views illustrating a change in the dq electric current vector and a change in the direct current for the motor, respectively, that are caused by the method for creating a data map for flux weakening control of a motor, in accordance with one or more embodiments.

As illustrated in FIG. 8, with the method for creating a data map for flux weakening control of a motor, in accordance with one or more embodiments, the magnitude of the dq electric current vector may be determined in such a manner as to be gradually decreased according to the direct current limitation for the motor. Accordingly, as illustrated in FIG. 9, the magnitude of direct current $i_b$ for the motor may be limited to given electric current limitation value $i_{blimit}$.

As described above, with the method for creating a data map for flux weakening control of a motor, in accordance with one or more embodiments, the direct current for the motor can be limited according to a users need. Particularly, with the method for creating a data map for flux weakening control of a motor, in accordance with one or more embodiments, instead of performing manual tuning, it is possible that the map is created using a computer system to which an appropriate algorithm is applied. Thus, the performance of the motor can be optimized.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code is segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the lane recognition method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access to memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if to components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. A motor flux weakening control method with data map creation, the method comprising:
   estimating a phase angle between a dq electric current vector for a motor and a q-axis based on a speed of the motor;
   calculating a torque of the motor based on the estimated phase angle;
   estimating a direct current that is input into the motor, based on an output of the motor;
   repeating the estimating of the phase angle and the estimating of the direct current while decreasing a magnitude of the dq electric current vector based on a difference between the estimated direct current and a preset direct current limitation value;
   interrupting the repeating of the estimating of the phase angle and the estimating of the direct current when the direct current estimated in the repeating of the estimating of the phase angle and the estimating of the direct current and the preset direct current limitation value are equal;
   storing a relationship between the speed of the motor, the direct current that is input into the motor, the phase angle, and the magnitude of the dq electric current vector when the estimated direct current and the preset direct current limitation value are equal; and optimizing electric power for the flux weakening control of the motor using the stored relationship.

2. The method of claim 1, wherein the torque of the motor is determined based on the estimated phase angle.

3. The method of claim 2, wherein the output of the motor is determined based on the determined torque, a resistance loss in the motor, and the direct current input into the motor.

4. The method of claim 1, wherein in the estimating of the phase angle, the phase angle is estimated based on the following equation:

$$\gamma(\omega_r) = \tan^{-1}\left(\frac{R_s^2}{(\omega_r L_s)^2}\right) + \sin^{-1}\left(\frac{v_L^2 - I_s^2\{R_s^2 + (\omega_r L_s)^2\} + \omega_r \phi}{2I_s \omega_r \phi}\Big/\sqrt{R_s^2 + (\omega_r L_s)^2}\right)$$

where $\gamma$ is the estimated phase angle, $R_s$ is the resistance in the motor, $L_s$ is an inductance in the motor, $\omega_r$ is a rotational speed of the motor, $$v_L = \frac{V_{dc}}{\sqrt{3}}, V_{dc} = V_{batt} - R_c i_b,$$

$V_{batt}$ is a battery voltage at which direct current power provided to the motor is stored, $R_c$ is a resistance of a conductive line from a battery to the motor, $i_b$ is the direct current having a preset initial value, $I_s$ is the magnitude of the dq electric current vector, and $\phi$ is a field magnet flux of the motor.

5. The method of claim 1, wherein in the estimating of the direct current, the direct current is estimated based on the following equation:

$$i_b = \frac{P_{output} + P_{ml}}{V_{dc}} = \frac{\tau\omega_r + \frac{3}{2}\left(\sqrt{i_d^2 + i_q^2}\right)^2 \times R_s}{V_{dc}}$$

where $i_b$ is the estimated direct current, $i_d = I_s \sin(\gamma)$, $i_q = I_s \cos(\gamma)$, $\gamma$ is the phase angle estimated in the estimating of the phase angle, $\tau = k_t \times i_q$, $k_t$ is a predetermined torque constant of the motor that is determined based on a characteristic of the motor, $\omega_r$ is a rotational speed of the motor, $R_s$ is a resistance in the motor, and $V_{dc}$ is the direct current voltage that is input into the motor.

6. The method of claim 1, wherein in the repeating of the estimating of the phase angle and the estimating of the direct current, for a motor speed section where a magnitude of the direct current estimated in the estimating of the direct current is larger than a direct current limitation value, an error value resulting from subtracting the direct current limitation value from the magnitude of the estimated direct current is obtained, the magnitude of the dq electric current vector is decreased based on the error value, the estimating of the phase angle and the estimating of the direct current are repeated by applying the decreased magnitude of the dq electric current vector.

7. The method of claim 6, wherein in the repeating of the estimating of the phase angle and the estimating of the direct current, a value obtained from multiplying the error value by a preset constant is subtracted from the magnitude of the dq electric current vector, the magnitude of the dq electric current vector is decreased, and the estimating of the phase angle and the estimating of the direct current are repeated by applying the decreased magnitude of the dq electric current vector.

8. The method of claim 1, further comprising:

repeating the estimating of the phase angle and the estimating of the direct current until a radix of an electric power function for an Electronic Control Unit (ECU) is obtained by implementing a Newton-Raphson Method to obtain the radix based on an entire electric power of a motor drive system, wherein the repeating of the estimating of the phase angle and the estimating of the direct current is performed subsequent to the estimating of the direct current.

9. The method of claim 8, wherein the electric power function for the ECU is determined based on the following equation:

$$P(i_b) = -V_{dc}i_b + i_b^2 R_c + \frac{3}{2}\left(\sqrt{i_d^2 + i_q^2}\right)^2 R_s + \tau\omega_r$$

where $P(i_b)$ is the electric power function for the ECU, $V_{dc}$ is the direct current voltage that is input into the motor, $i_b$ is the estimated direct current, $i_d = I_s \sin(\gamma)$, $i_q = I_s \cos(\gamma)$, $\gamma$ is the phase angle estimated in the estimating of the phase angle, $R_s$ is a resistance in the motor, $\tau = k_t \times i_q$, $k_t$ is a predetermined torque constant of the motor that is determined based on a characteristic of the motor, $\omega_r$ is a rotational speed of the motor, and $R_c$ is a resistance of a conductive line from a battery in which direct current power provided to the motor is stored.

10. The method of claim 9, wherein in the repeating of the estimating of the phase angle and the estimating of the direct current until the radix of an electric power function for the ECU is obtained, to obtain the radix that satisfies $P(i_b)=0$, the estimating of the phase angle and the estimating of the direct current are repeated until $$\frac{P(i_{bi})}{P'(i_{bi})}$$

becomes less than a preset reference value in the following equation:

$$\frac{P(i_{bi})}{P'(i_{bi})}$$

where $P'(i_b)$ is a differential of $P(i_b)$.

11. A motor flux weakening control data map creation system, comprising:

one or more processors, configured to:

estimate a phase angle between a dq electric current vector for a motor and a q-axis based on a speed of the motor;

calculate a torque of the motor based on the estimated phase angle;

estimate a direct current that is input to the motor based on an output of the motor;

repeat the estimating of the phase angle and the estimating of the direct current while decreasing a magnitude of the dq electric current vector based on a difference between the estimated direct current and a preset direct current limitation value;

interrupt the repeating of the estimating of the phase angle and the estimating of the direct current when the direct current estimated in the repeating of the estimating of the phase angle and the estimating of the direct current and the preset direct current limitation value are equal;

store a relationship between the speed of the motor, the direct current that is input into the motor, the phase angle, and the magnitude of the dq electric current vector when the estimated direct current and the preset direct current limitation value are equal; and optimize electric power to the motor during the flux weakening control using the stored relationship.

12. The method of claim 11, wherein the torque of the motor is determined based on the estimated phase angle.

13. The method of claim 12, wherein the output of the motor is determined based on the determined torque, a resistance loss in the motor, and the direct current input into the motor.

14. A motor flux weakening control method with data map creation, the method comprising:

estimating a phase angle between a dq electric current vector for a motor and a q-axis based on a speed of the motor;

calculating a torque of the motor based on the estimated phase angle;

estimating a direct current that is input into the motor, based on an output of the motor;

repeating the estimating of the phase angle and the estimating of the direct current while decreasing a magnitude of the dq electric current vector based on a difference between the estimated direct current and a preset direct current limitation value on the direct current that is input into the motor;

interrupting the repeating of the estimating of the phase angle and the estimating of the direct current when the direct current estimated in the repeating of the estimating of the phase angle and the estimating of the direct current and the preset direct current limitation value are equal;

storing a relationship between the speed of the motor, the direct current that is input into the motor, the phase angle, and the magnitude of the dq electric current vector when the estimated direct current and the preset direct current limitation value are equal; and optimizing electric power to the motor during the flux weakening control using the stored relationship.

* * * * *